United States Patent
Reid (10) Patent No.: US 11,174,787 B2
(45) Date of Patent: Nov. 16, 2021

(54) OIL TANK

(71) Applicant: Rolls-Royce plc, London (GB)

(72) Inventor: Mark P. Reid, Derby (GB)

(73) Assignee: Rolls-Royce plc, London (GB)

( * ) Notice: Subject to any disclaimer, the term of this patent is extended or adjusted under 35 U.S.C. 154(b) by 75 days.

(21) Appl. No.: 16/389,190

(22) Filed: Apr. 19, 2019

(65) Prior Publication Data
US 2019/0338705 A1 Nov. 7, 2019

(30) Foreign Application Priority Data
May 3, 2018 (GB) ..................................... 1807266

(51) Int. Cl.
*F01D 25/18* (2006.01)
*F02C 7/06* (2006.01)
*F01M 1/10* (2006.01)

(52) U.S. Cl.
CPC ................ *F02C 7/06* (2013.01); *F01D 25/18* (2013.01); *F01M 1/10* (2013.01); *F01M 2001/1071* (2013.01); *F05D 2260/608* (2013.01); *F05D 2260/98* (2013.01)

(58) Field of Classification Search
CPC .... F01D 25/18; F02C 7/06; F01M 2001/1071
See application file for complete search history.

(56) References Cited

U.S. PATENT DOCUMENTS

| 6,279,555 | B1 | 8/2001 | Crowell et al. |
| 8,181,746 | B2* | 5/2012 | Szolomayer ............ F01D 25/18 184/6.11 |
| 2009/0126709 | A1 | 5/2009 | Manookian, Jr. |
| 2013/0073171 | A1* | 3/2013 | Muller .................... F01M 11/12 701/100 |
| 2017/0096938 | A1* | 4/2017 | Kenworthy ............. F02C 7/224 |

FOREIGN PATENT DOCUMENTS

| CA | 2861179 | 6/2015 |
| EP | 2166196 | 3/2010 |
| GB | 642621 | 9/1950 |

OTHER PUBLICATIONS

Extended Search Report dated Sep. 24, 2019 in connection with European Patent Application No. 19167055.3, applicant Rolls-Royce plc (8 pages).
Search Report issued in connection with GB Patent Appl. No. 1807266.0 dated Oct. 18, 2018 (1 page).

* cited by examiner

*Primary Examiner* — Michael L Sehn
(74) *Attorney, Agent, or Firm* — Simpson & Simpson, PLLC (57) ABSTRACT

An oil tank (100) for a gas turbine engine is provided. The oil tank (100) comprises an oil inlet (102), an oil outlet (104), and a body including a coiled portion (106) interposed between the oil inlet (102) and the oil outlet (104). Oil is received by the coiled portion (106). The coiled portion (106) acts to at least partially de-aerate oil received from the oil inlet (104).

19 Claims, 6 Drawing Sheets

OIL TANK

CROSS-REFERENCE TO RELATED APPLICATIONS

This specification is based upon and claims the benefit of priority from United Kingdom patent application Number GB 1807266.0 filed on May 3, 2018, the entire contents of which are incorporated herein by reference.

FIELD OF THE DISCLOSURE

The present disclosure relates to an oil tank for a gas turbine engine, and more particularly but not necessarily exclusively for a gas turbine engine comprising a gearbox. The present disclosure also relates to a gas turbine engine including an oil tank and an aircraft including a gas turbine engine including an oil tank.

BACKGROUND OF THE DISCLOSURE

Figure 4:
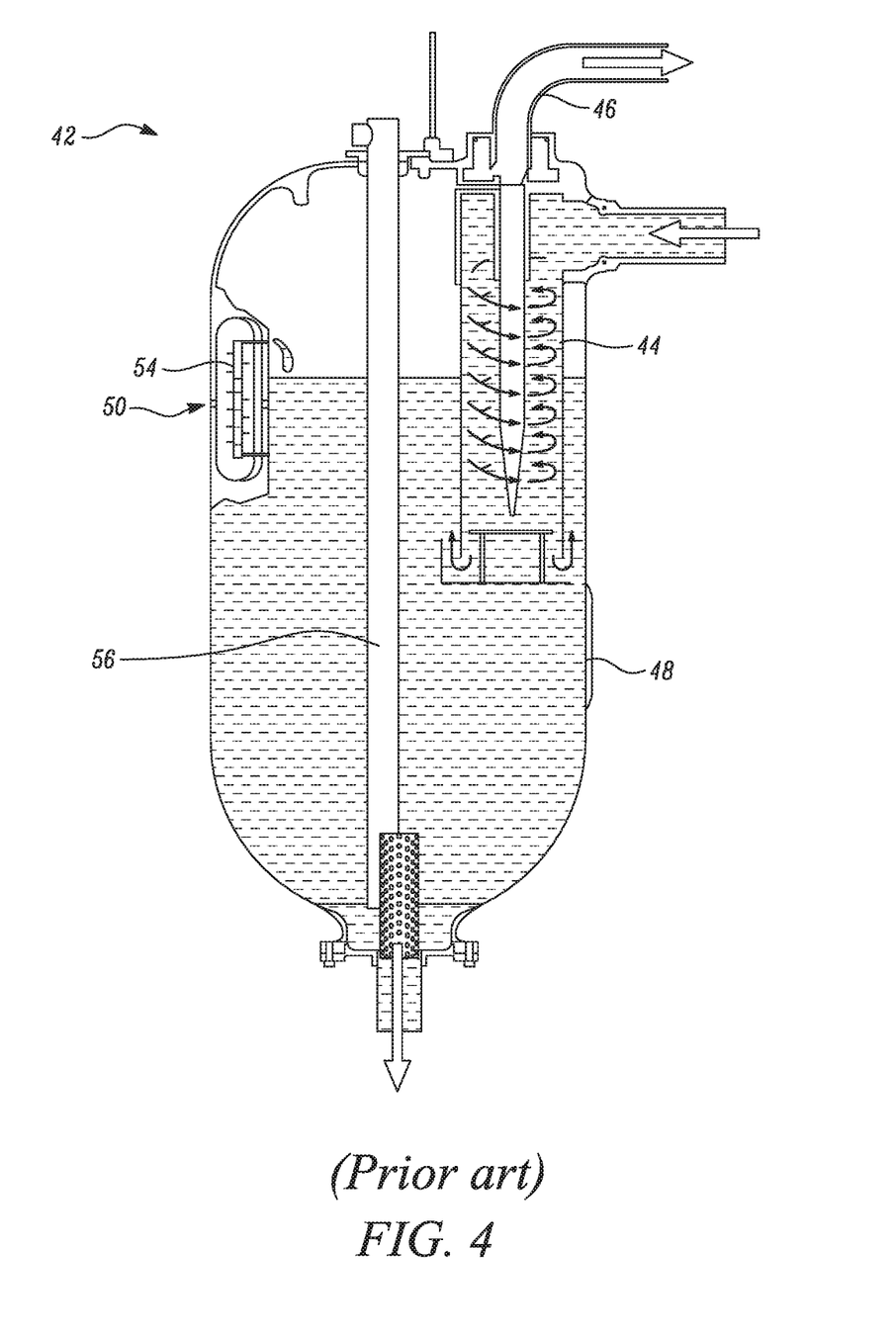
FIG. 4 is a sectional view of a known oil tank.

Oil tank systems, particularly those in aircraft, are used to store oil from a part of an oil system such that the oil may be recirculated throughout the system. Scavenge pumps are used to extract the oil, but this often results in a mixture of air and oil, being extracted by the scavenge pump and being fed to the oil tank system. A known oil tank system 42 is shown in FIG. 4.

The known oil tank system 42 includes a de-aerator 44, which receives scavenged oil, which is aerated, and submits it to a de-aeration process in order to separate a majority of the air from the oil. This process may be achieved by inducing a vortex within the oil flow, the air that separates during the vortex then being released from the oil tank system 42 by a venting pipe 46. The deaerated oil can then pass out of the de-aerator 44 into an oil tank 48, from which it can be stored and then pumped out for use throughout an oil system (not shown). An oil level indicator 50 may be provided on the side of the oil tank 48, and may take the form of an indicator window 54, allowing an operator to view the level of oil within the oil tank 48. An electronic oil level sensor 56 is also provided, which provides an electronic measure of the oil level to an external device (not shown).

For various reasons, it may be required to provide an oil tank with a larger capacity than known oil tanks. Where this larger capacity results in a significantly extended vertical extent of the oil tank, it has been noted that oil leaving the de-aerator and being deposited in the oil tank may fall a substantial distance from the de-aerator, depending on the oil level within the oil tank, resulting in agitation of the oil surface, partial reaeration of the oil, and an unrepresentative indicated oil level, which is undesirable.

It is therefore an object of the present invention to provide an improved oil tank in view of the above or at least to provide a useful alternative.

BRIEF SUMMARY OF THE DISCLOSURE

According to a first aspect, there is provided an oil tank for a gas turbine engine, the oil tank comprising;
an oil inlet for receiving oil from a scavenge supply line;
an oil outlet; and
a body for transmitting and storing oil, the body defining a flow path between the oil inlet and the oil outlet;
wherein the body includes a coiled portion that forms a part of the flow path and forms an outer wall of the oil tank.

The coiled portion may be configured to remove air from the oil, the body further comprising an air outlet for venting the air from the oil tank.

The coiled portion may, in use, provide de-aeration of the oil entering the tank through the oil inlet.

The air outlet may be located on an uppermost coil of the coiled portion.

The coiled portion may be configured to impart angular acceleration to the oil received from the scavenge supply line.

The coiled portion may be configured to receive oil directly from the scavenge supply line.

The coiled portion may extend directly from the oil inlet.

The coiled portion may extend directly to the oil outlet.

The coiled portion may be formed as a helix or as a part-helix.

The coiled portion may have coil axis that is oriented vertically or substantially vertically. By "coil axis", it is meant the direction of extension of a non-planar coil, or the direction perpendicular to the plane of a planar coil. The orientation of the coil axis may be measured whilst the oil tank is in its standard position, by which we mean, for example, the position it is in when installed in a gas turbine engine or aircraft.

A surface of the coiled portion may be configured to enhance oil adhesion.

The surface of the coiled portion may comprise surface features for enhancing mechanical adhesion of oil to the surface. Such surface features may include micro-voids, channels, ridges, protrusions, or any other feature that is capable of increasing the adhesion of oil, in particular aviation oil. The size and shape of the surface features may be chosen to increase adhesion with a particular composition of oil.

The surface of the coiled portion may comprise a material for enhancing dispersive adhesion of oil to the surface. The particular material chosen may be chosen to increase adhesion with a particular composition of oil.

The oil tank may further comprise an air communication line between a first part of the oil tank and a second part of the oil tank.

The first part of the oil tank and second part of the oil tank may each be a part of the coiled portion.

The oil tank may further comprise an oil level sensor and/or an oil temperature sensor.

The oil level sensor and/or the oil temperature sensor may be provided as a single unit within the oil tank.

The oil level sensor and/or the oil temperature sensor may be provided on the air communication line.

The oil tank, for example the coiled portion, may be formed from standard piping. For example, the size of the piping may correspond to British standards, American standards, International standards, or any standard known to those skilled in the art: ADME, ANSI, ASTM, AGA, API, AWWA, BC, ISO, DIN, etc.

The coiled portion may be formed by coiling or bending pipe, for example standard piping, around a former. Other methods of bending may also be used.

The coiled portion may have a slight freedom of movement in order to enhance absorption of vibration. This freedom may be provided by a flexible coupling of the coiled portion to the oil inlet, oil outlet, or another part of the oil tank. The freedom of movement may also be provided by providing spacing between adjacent coils of the coiled portion, such that they may move relative to one another. The freedom of movement may also be provided by non-rigid fixing of adjacent coils, for example allowing sliding movement between coils.

"Coiled portion" as used herein denotes a portion that is generally coil shaped or otherwise resembles a coil. For example a coiled portion of a body can be a part of the body that is wound into a shape that resembles a coil, for example a wound spiral so that oil passing through that part of the body follows a spiral course.

According to a second aspect, there is provided a gas turbine engine for an aircraft, the gas turbine engine comprising:
  an engine core comprising a turbine, a compressor, and a core shaft connecting the turbine to the compressor;
  a fan located upstream of the engine core, the fan comprising a plurality of fan blades; and
  an oil tank according to the first aspect.

The gas turbine engine may further comprise a gearbox that receives an input from the core shaft and outputs drive to the fan so as to drive the fan at a lower rotational speed than the core shaft.

The oil tank may deliver oil to and/or scavenge oil, directly or indirectly, from the gearbox.

The turbine may be a first turbine, the compressor may be a first compressor, and the core shaft may be a first core shaft.

The engine core may further comprise a second turbine, a second compressor, and a second core shaft connecting the second turbine to the second compressor.

The second turbine, second compressor, and second core shaft may be arranged to rotate at a higher rotational speed than the first core shaft.

According to a third aspect, there is provided an aircraft including a gas turbine engine according to the second aspect.

BRIEF DESCRIPTION OF THE DRAWINGS

Embodiments will now be described by way of example only, with reference to the Figures, in which.

DETAILED DESCRIPTION OD THE DISCLOSURE

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures.

Figure 1:
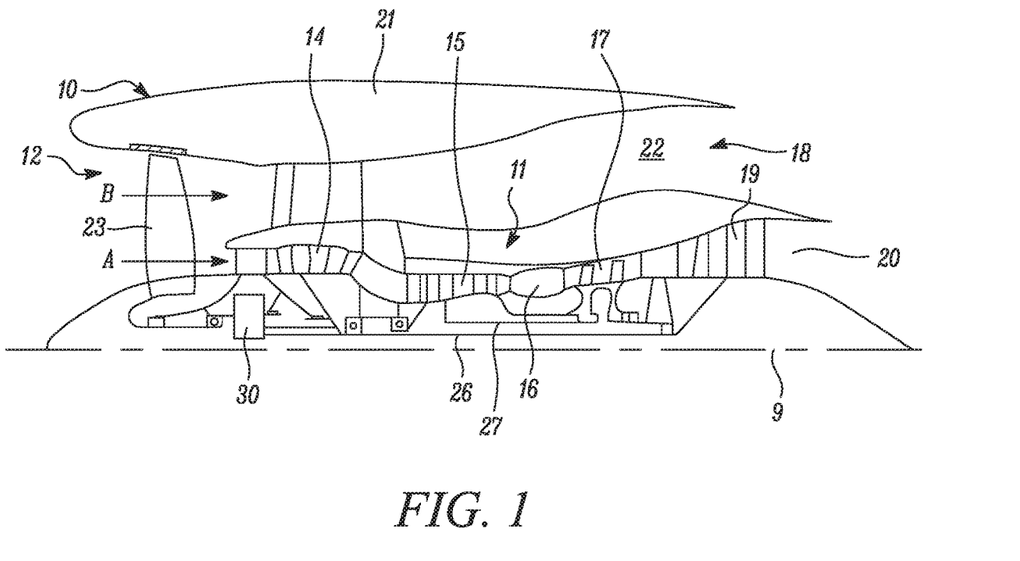
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it mixed with fuel and the mixture is combusted. The resultant hot combustion products then expand through and thereby drive the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
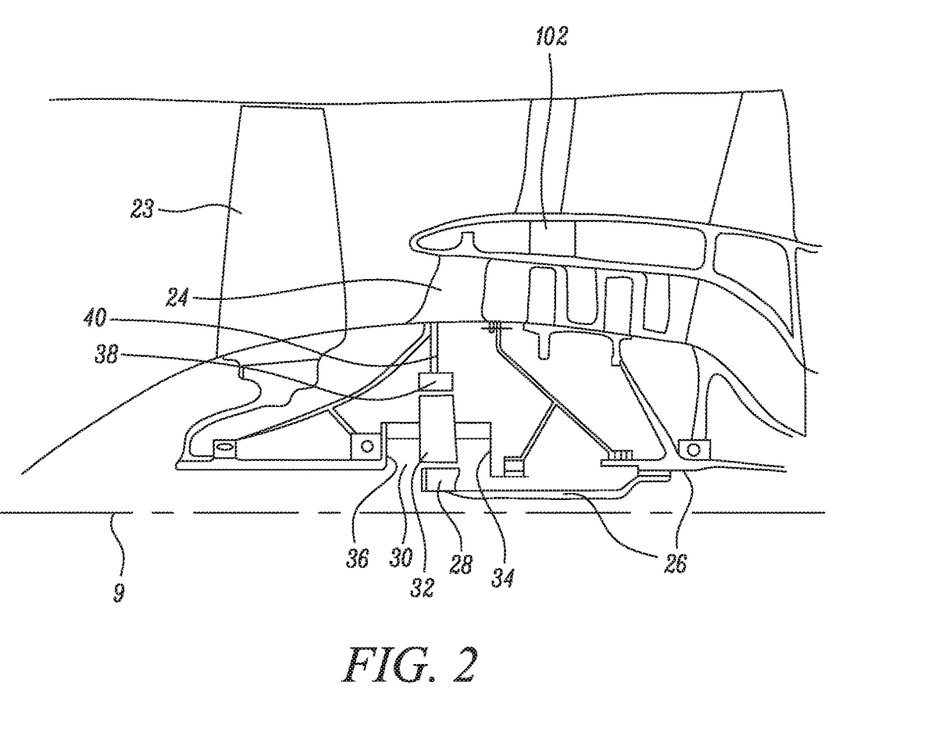
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
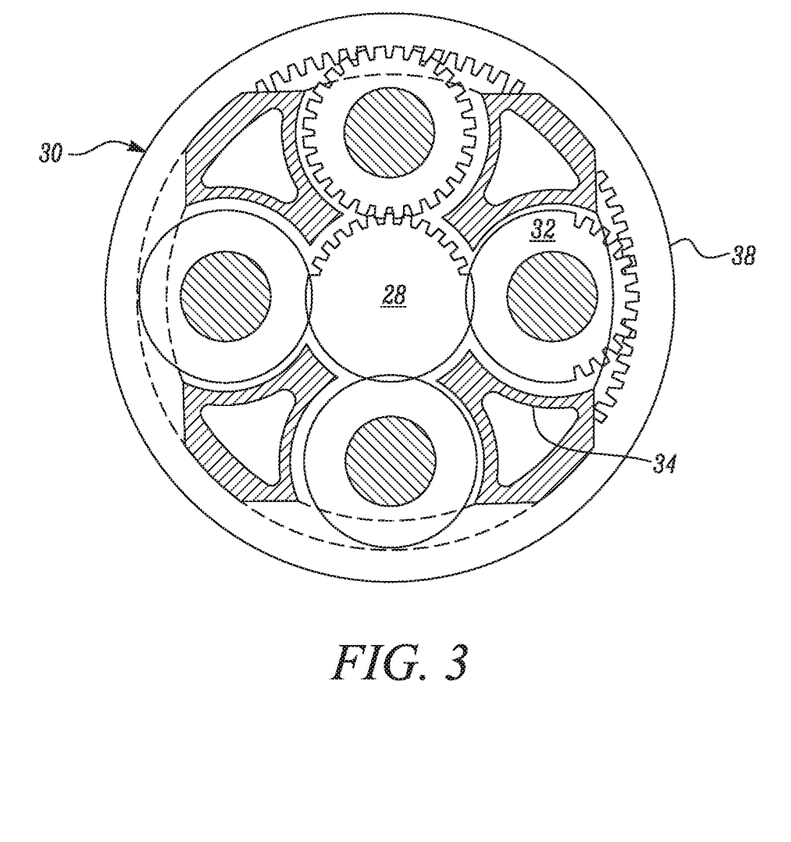
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Turning now more specifically to the oil tank of the present disclosure that may be used in such a gas turbine engine.

Figure 5:
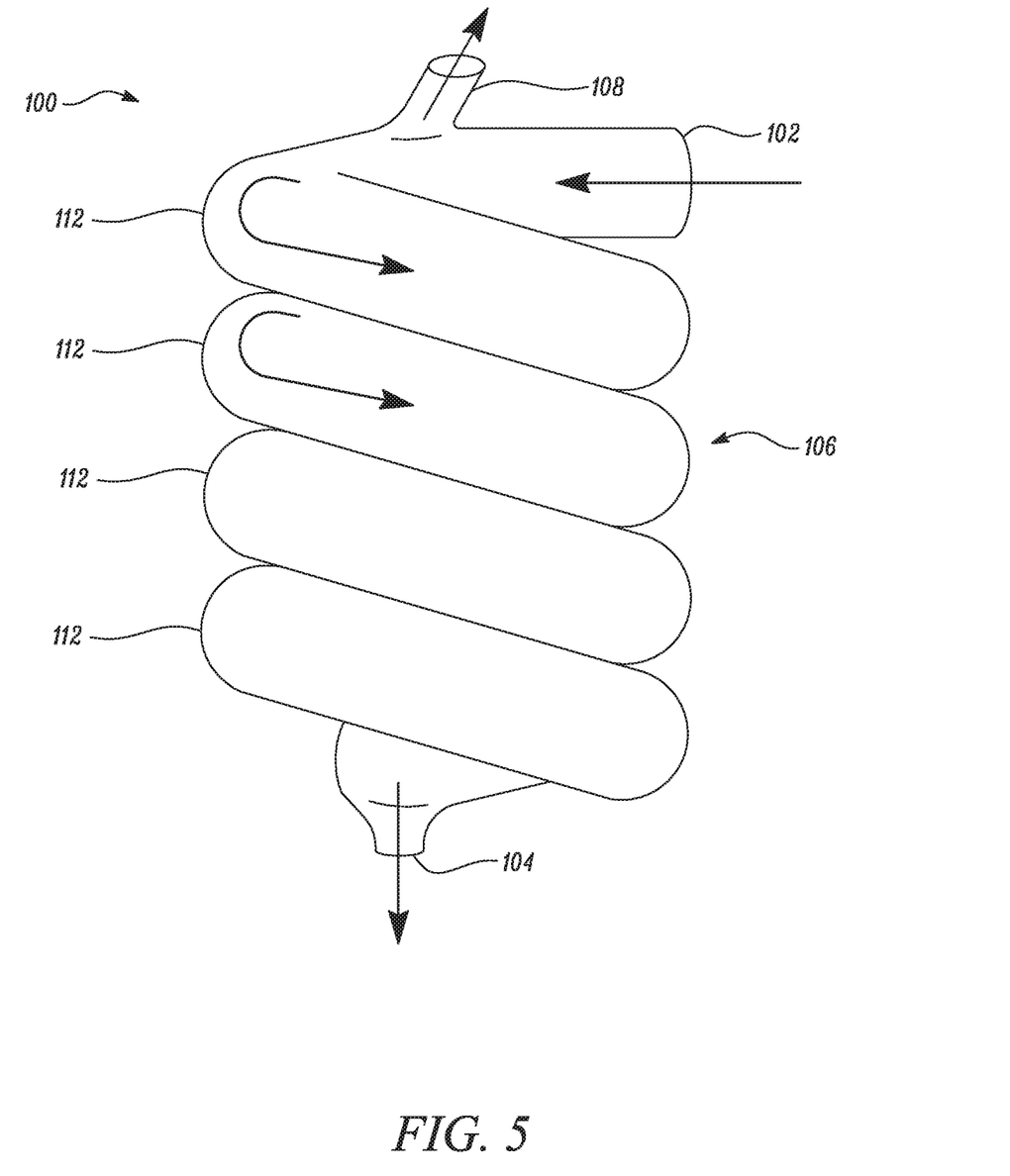
FIG. 5 is an embodiment of an oil tank in accordance with the disclosure.
Figure 6:
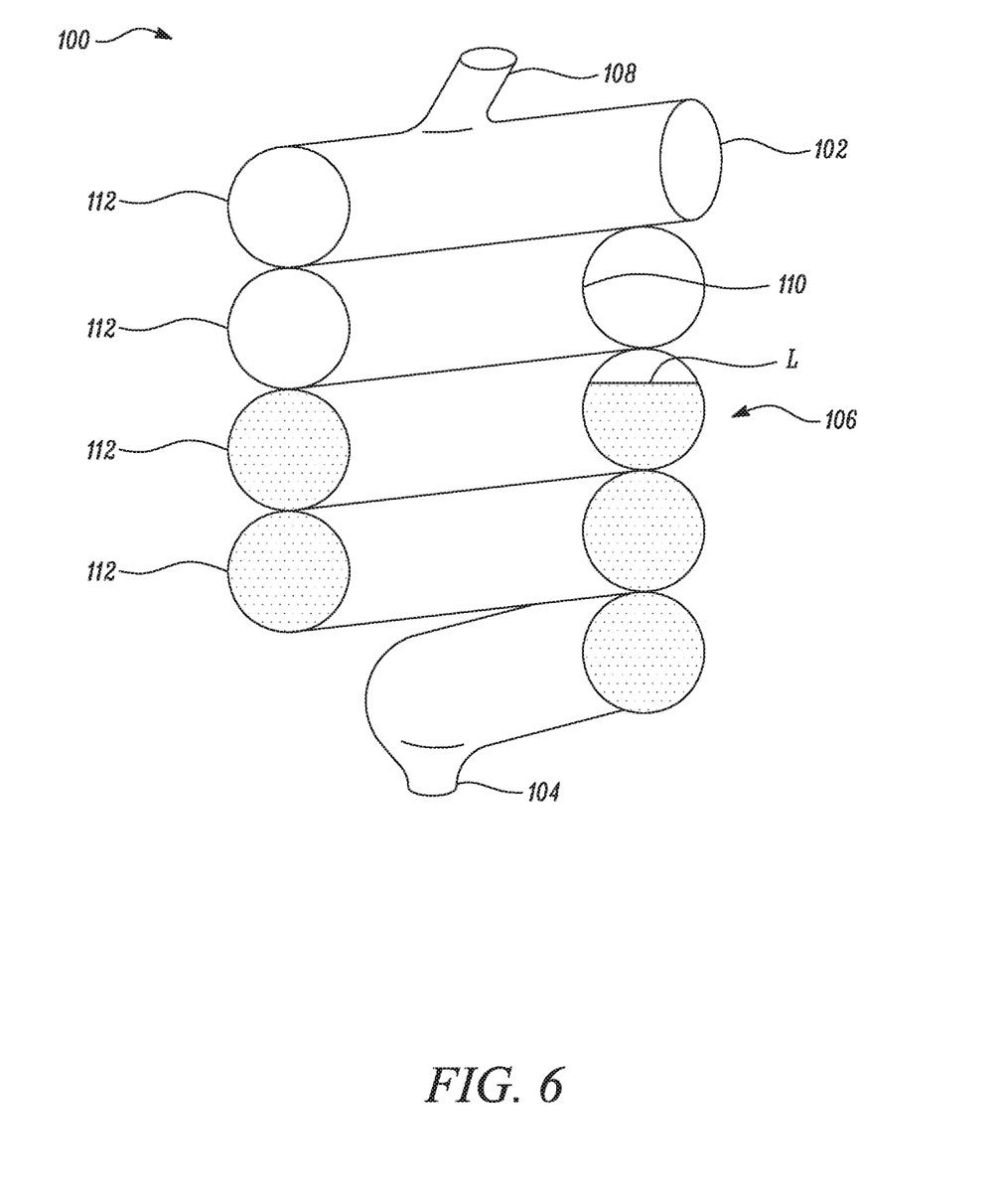
FIG. 6 is a cross-sectional view of the oil tank of FIG. 5, showing the oil level.

FIG. 5 and FIG. 6 show an embodiment of an oil tank 100 in accordance with the disclosure. The oil tank 100 receives scavenged oil from an oil system (not shown) via a scavenged oil supply inlet 102. The oil tank 100 includes an oil outlet 104 for delivery of oil back to the oil system, for example via an oil pump. The oil tank 100 is also shown in situ within the gas turbine engine in FIG. 2.

The oil tank 100 comprises a body including a coiled portion 106 in the form of a helix that extends between the oil inlet 102 and the oil outlet 104. The coiled portion 106 therefore transfers oil from the oil inlet 102 to the level of the oil already held within the oil tank 100. The body therefore forms a flow path between the oil inlet and the oil outlet, the coiled portion 106 forming a part of the flow path. Although described in relation to the depicted embodiment as a helix, the coiled shape need not be perfectly helical and may vary in radius or curvature along its length.

As the oil tank 100 is elongate, having a large vertical extent compared to its horizontal extent, if the oil level, L, is relatively low, the scavenged oil may have a relatively large length of the oil tank 100 to travel in order to arrive at the oil level. In order to limit oil surface agitation and aeration of the oil during this travel—or an even longer travel if the level of the oil is within the oil tank 100—the depicted coiled portion 106 provides a continuous gradient for the transmission of oil through the length of the oil tank 100. Other examples of oil tank may have a varying gradient along their length.

The vertical drop of any oil in the oil tank 100 is therefore limited to the height of the cross-section of the coiled portion 106. However, due to the pressure of the oil entering from the scavenge line, it is far more likely that oil will form a film on the interior walls of the coiled portion 106 and then drain in a controlled manner to the oil level within the oil tank 100. Air released from the oil during its passage through the oil tank 100 is able to rise due to its own buoyancy and exit the tank 100 via an air outlet 108 situated at the top of the oil tank 100. The air outlet 108 is depicted as being a channel leading off the uppermost coil of the coiled portion 106, but may also extend from a sidewall or from a lower coil, for example.

The surface 110 of the interior of the oil tank 100, including the coiled portion 106, may be configured so as to enhance adhesion of oil. This configuration further helps to prevent aeration and ensuring that oil joining the oil level within the oil tank 100 does not act to overly agitate the surface.

The term adhesion is considered to include all types of adhesion such as mechanical adhesion and dispersive adhesion, as well as any other mechanism by which oil can be encouraged to remain in contact with the surface of the oil tank 100.

Mechanical adhesion may be enhanced through the use of particular surface features, patterns, etc. For example, mechanical adhesion may be enhanced by the provision of channels, pores, ridges, protrusions, or undulations, either on the micro- or macro-scale, which act to keep the oil in adherence with the surface.

Alternatively or additionally, the surface 110 may include materials that act to increase a dispersive adhesion with the particular composition of oil used within the oil tank and system.

In addition, the coiled portion 106 of the oil tank 100 can act to limit movement of oil during short-term negative-G conditions. The coils 112 slow the movement of oil, delaying the onset of oil rising to the top of the oil tank 100. This will prolong the delivery of oil to the oil pump (not shown) situated in the oil system after the oil outlet 104 of the oil tank 100.

The large surface area of the coiled portion 106, along with the large residence time granted by its shape, allows the coiled portion 106 to act as a de-aerator, removing the requirement for a separate de-aerator within the oil system. Despite this, an additional de-aerator may also be included within the oil system, if required.

A benefit of the coiled portion 106 may be that loads incident on the oil tank 100, for example those resulting from a fan-blade off situation, can be absorbed to at least some extent by the natural spring action of the coiled portion 106. As well as absorbing one-time, irregular, or intermittent forces, the coiled portion 106 may also act to absorb more regular forces, such as those produced by vibrations within the engine and by other parts of the aircraft.

Figure 7:
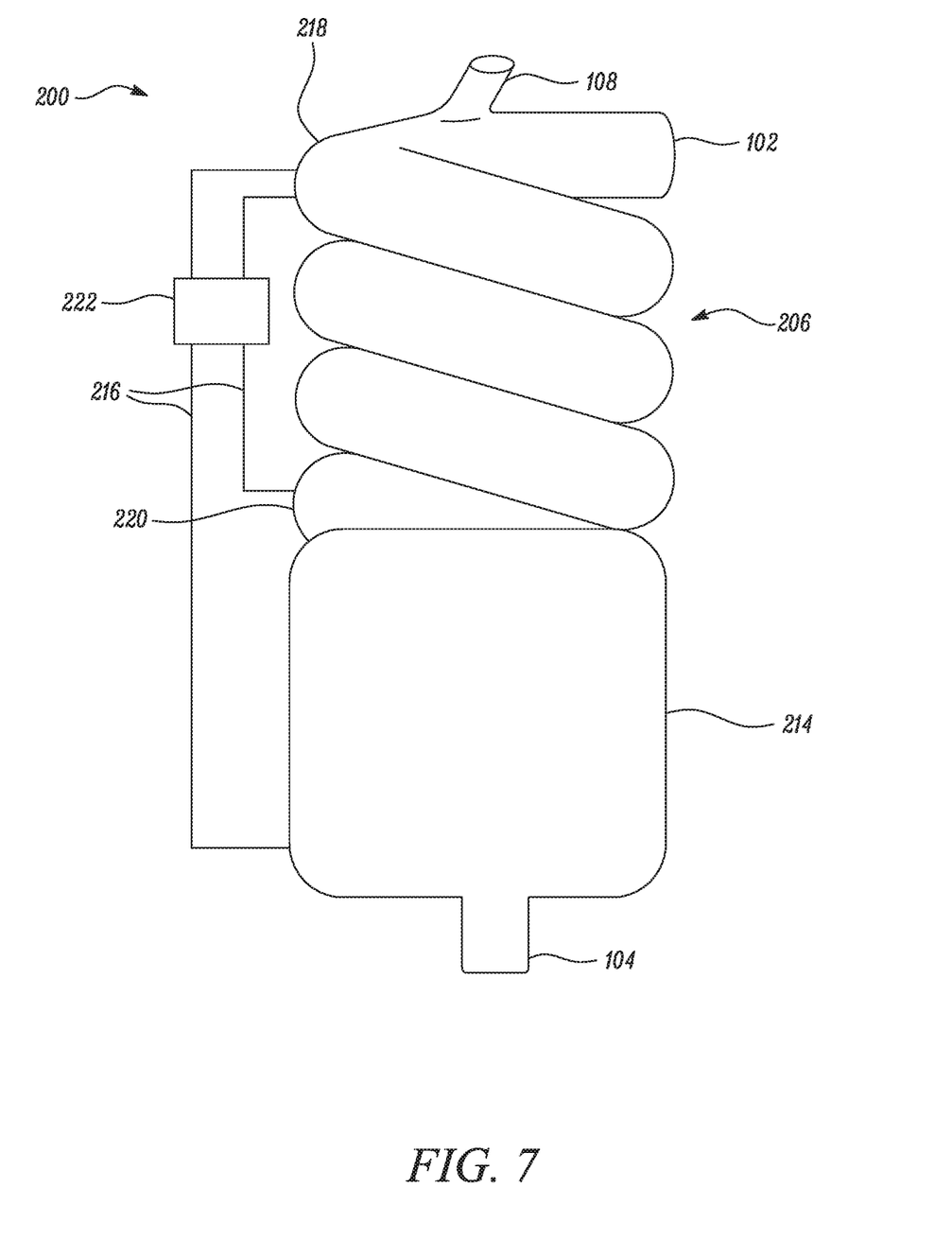
FIG. 7 is a second embodiment of an oil tank in accordance with the disclosure.

A second embodiment of an oil tank 200 is shown in FIG. 7. Where features of the oil tank 200 are identical to those of the first oil tank 100, identical reference numerals are used.

The oil tank 200 comprises a body including a coiled portion 206 and a lower tank portion 214. The lower tank portion 214 is, in the depicted example, the shape of a standard tank, acting as a storage container for the oil. By providing the oil tank 200 in this manner, the coiled portion 206 can carry out the de-aeration of oil and limit fall of the oil within the oil tank 200, whilst the lower tank portion 214 maximises the storage volume of the oil tank 200 below the coiled portion 206. The coiled portion 206 therefore feeds oil to the lower tank portion 214.

The oil tank 200 of the second embodiment also includes two air communication lines 216. The air communication lines 216 interlink an upper part 218 of the coiled portion 206 with each of a lower part 220 of the coiled portion 206 and the lower tank portion 214. These act to provide an additional interconnection between the portions of the oil tank 200 and thus prevent the formation of air pockets within the oil tank 200. The air communication lines 216 therefore support the changes in oil level that may occur during changing engine operating conditions and changing oil consumption during a flight.

Moreover, sensors 222 such as oil level sensors and/or oil temperature sensors are included with the air communication lines 216 in order to allow monitoring of the oil level or oil temperature. The air communication lines 216 may run remotely from the oil tank 200 in order to provide easier access for a user to monitor temperatures or levels.

Oil tanks within the scope of the disclosure may include multiple coiled portions, or may include coiled portions that are not directly connected to the oil inlet, i.e. there may be intervening oil tank parts, for example, but not limited to, filters or other oil tank portions.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. An oil tank for a gas turbine engine, the oil tank comprising:
   an oil inlet for receiving oil from a scavenge supply line;
   an oil outlet; and
   a body for transmitting and storing oil, the body defining a single flow path between the oil inlet and the oil outlet;
   wherein the body includes a coiled portion that is hollow and includes an interior surface, wherein the coiled portion forms a part of the single flow path and an outer wall of the oil tank, and wherein the part of the single flow path formed by the coiled portion is fully enclosed by the interior surface of the coiled portion.

2. The oil tank of claim 1, wherein the coiled portion is configured to remove air from the oil, the body further comprising an air outlet for venting the air from the oil tank.

3. The oil tank of claim 2, wherein the air outlet is located on an uppermost coil of the coiled portion.

4. The oil tank of claim 1, wherein the coiled portion is configured to impart angular acceleration to the oil received from the scavenge supply line.

5. The oil tank of claim 1, wherein the coiled portion is configured to receive oil directly from the scavenge supply line.

6. The oil tank of claim 1, wherein the coiled portion extends directly from the oil inlet and directly to the oil outlet.

7. The oil tank of claim 1, wherein the coiled portion is formed as a helix or part-helix.

8. The oil tank of claim 1, wherein the coiled portion has a coil axis that is oriented vertically or substantially vertically.

9. The oil tank of claim 1, further comprising an air communication line between a first part of the oil tank and a second part of the oil tank.

10. The oil tank of claim 9, wherein the first part of the oil tank and the second part of the oil tank are each a part of the coiled portion.

11. The oil tank of claim 9, wherein an oil level sensor and/or oil temperature sensor are provided on the air communication line.

12. The oil tank of claim 1, further comprising an oil level sensor and/or an oil temperature sensor.

13. A gas turbine engine for an aircraft, the gas turbine engine comprising:
    an engine core comprising a turbine, a compressor, and a core shaft connecting the turbine to the compressor;
    a fan located upstream of the engine core, the fan comprising a plurality of fan blades; and an oil tank according to claim 1.

14. The gas turbine engine of claim 13, further comprising a gearbox that receives an input from the core shaft and outputs drive to the fan so as to drive the fan at a lower rotational speed than the core shaft.

15. The gas turbine engine of claim 14, wherein the oil tank is configured to deliver oil to and/or scavenge oil, directly or indirectly, from the gearbox.

16. The gas turbine engine of claim 13, wherein the turbine is a first turbine, the compressor is a first compressor, and the core shaft is a first core shaft.

17. The gas turbine engine of claim 16, wherein the engine core further comprises a second turbine, a second compressor, and a second core shaft connecting the second turbine to the second compressor.

18. The gas turbine engine of claim 17, wherein the second turbine, the second compressor, and the second core shaft are arranged to rotate at a higher rotational speed than the first core shaft.

19. An aircraft including a gas turbine engine according to claim 1.

* * * * *